(12) United States Patent
Kim et al.

(10) Patent No.: US 12,473,561 B2
(45) Date of Patent: Nov. 18, 2025

(54) METHOD OF OVEREXPRESSING TARGET GENE USING ELECTROMAGNETIC WAVE-REACTIVE PROMOTER

(71) Applicant: DONGGUK UNIVERSITY INDUSTRY-ACADEMIC COOPERATION FOUNDATION, Seoul (KR)

(72) Inventors: Jongpil Kim, Seoul (KR); Junsang Yoo, Seoul (KR)

(73) Assignee: DONGGUK UNIVERSITY INDUSTRY-ACADEMIC COOPERATION FOUNDATION, Seoul (KR)

( * ) Notice: Subject to any disclaimer, the term of this patent is extended or adjusted under 35 U.S.C. 154(b) by 404 days.

(21) Appl. No.: 17/285,430

(22) PCT Filed: Dec. 13, 2019

(86) PCT No.: PCT/KR2019/017747
§ 371 (c)(1),
(2) Date: Apr. 14, 2021

(87) PCT Pub. No.: WO2020/080920
PCT Pub. Date: Apr. 23, 2020

(65) Prior Publication Data
US 2023/0059930 A1    Feb. 23, 2023

(51) Int. Cl.
*C12N 15/67*    (2006.01)
*A61K 35/30*    (2015.01)
*A61K 35/32*    (2015.01)
*A61P 19/00*    (2006.01)
*A61P 25/00*    (2006.01)
*C12N 13/00*    (2006.01)

(52) U.S. Cl.
CPC .............. *C12N 15/67* (2013.01); *A61K 35/30* (2013.01); *A61K 35/32* (2013.01); *A61P 19/00* (2018.01); *A61P 25/00* (2018.01); *C12N 13/00* (2013.01)

(58) Field of Classification Search
CPC ........................... C12N 15/67; C12N 2529/00
See application file for complete search history.

(56) References Cited

FOREIGN PATENT DOCUMENTS

| KR | 10-2015-0045557 | 4/2015 |
| KR | 10-1518096 | 5/2015 |
| KR | 10-2017-0048111 | 6/2017 |
| WO | WO 2012-035120 | 3/2012 |

OTHER PUBLICATIONS

Erdal et al. Progress in Biophysics and Molecular Biology 132 (Jan. 2018): 35-42 (Year: 2018).*
KR 10-2013-0061978; publication of unexamined application; publication date:Jun. 12, 2013; corresponds to KR-10-1518096 of record in IDS 4/14/2021Translation pp. 1-8 (Year: 2013).*
Anton, Martina, et al. "Optimization of radiation controlled gene expression by adenoviral vectors in vitro." *Cancer Gene Therapy* 12.7 (2005): 640-646.
International Search Report and Written Opinion issued in International No. PCT/KR2019/017747, dated Apr. 3, 2020.
Khan, Kishwar Hayat. "Gene expression in mammalian cells and its applications." *Advanced Pharmaceutical Bulletin* 3.2 (2013): 257.
Norrman, Karin, et al. "Quantitative comparison of constitutive promoters in human ES cells." *PloS One* 5.8 (2010): e12413.
Seong, Yeju, Jihye Moon, and Jongpil Kim. "Egr1 mediated the neuronal differentiation induced by extremely low-frequency electromagnetic fields." *Life Sciences* 102.1 (2014): 16-27.
Yoo, Junsang, et al. "Electromagnetized gold nanoparticles mediate direct lineage reprogramming into induced dopamine neurons in vivo for Parkinson's disease therapy." *Nature Nanotechnology* 12.10 (2017): 1006.

* cited by examiner

*Primary Examiner* — Marcia S Noble
(74) *Attorney, Agent, or Firm* — pH IP Law

(57) ABSTRACT

Provided are a method of overexpressing a target gene and/or a method of reprogramming cells, the method including steps of (a) introducing a vector into cells, into which vector a promoter and a target gene are inserted; and (b) applying an electromagnetic wave to the cells obtained in the step (a), and a method of treating a disease using the method.
When the method of overexpressing a target gene using the electromagnetic wave-reactive promoter of the present disclosure is used, it is possible to artificially regulate expression levels of desired target genes in a simple manner in vivo and in vitro and to regulate expression of the target genes until a desired predetermined time.

2 Claims, 13 Drawing Sheets

Specification includes a Sequence Listing.

[FIG. 1]
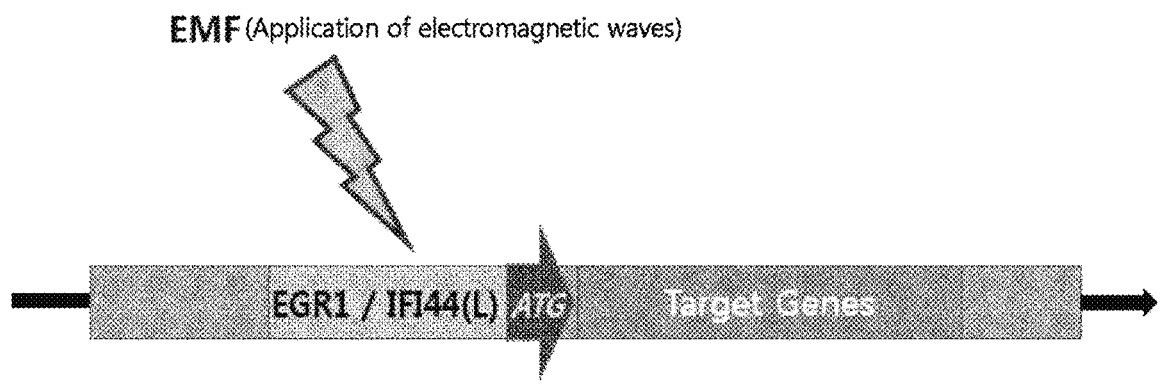
[FIG. 2]
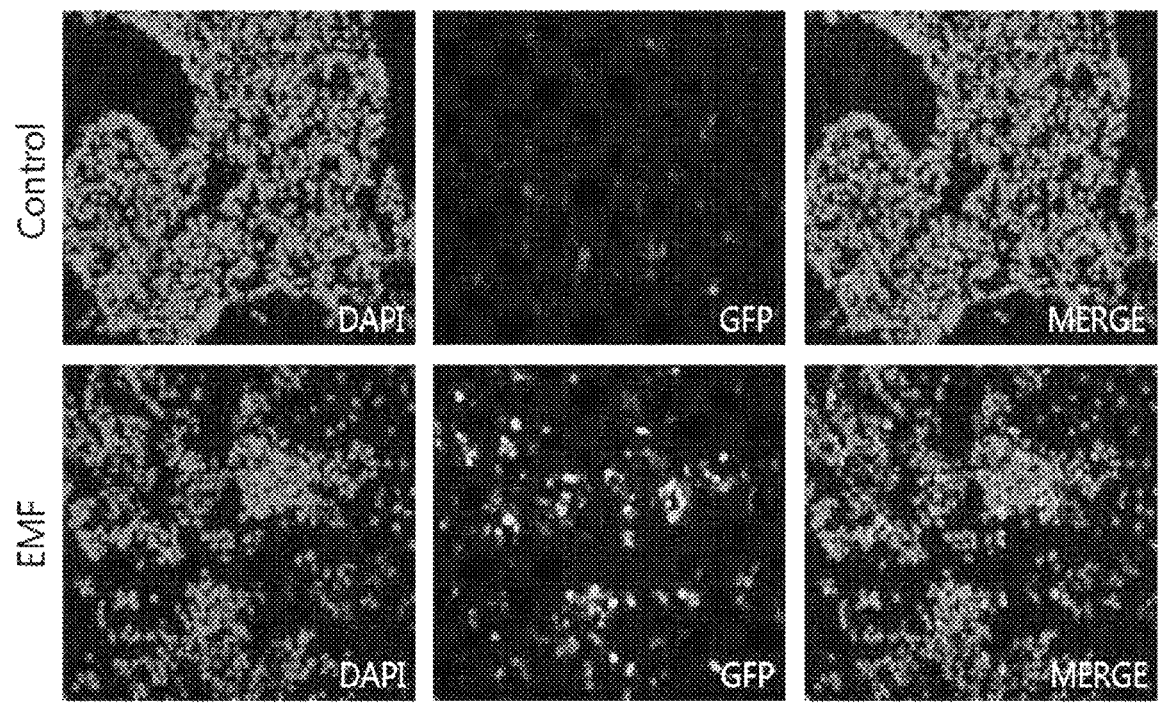

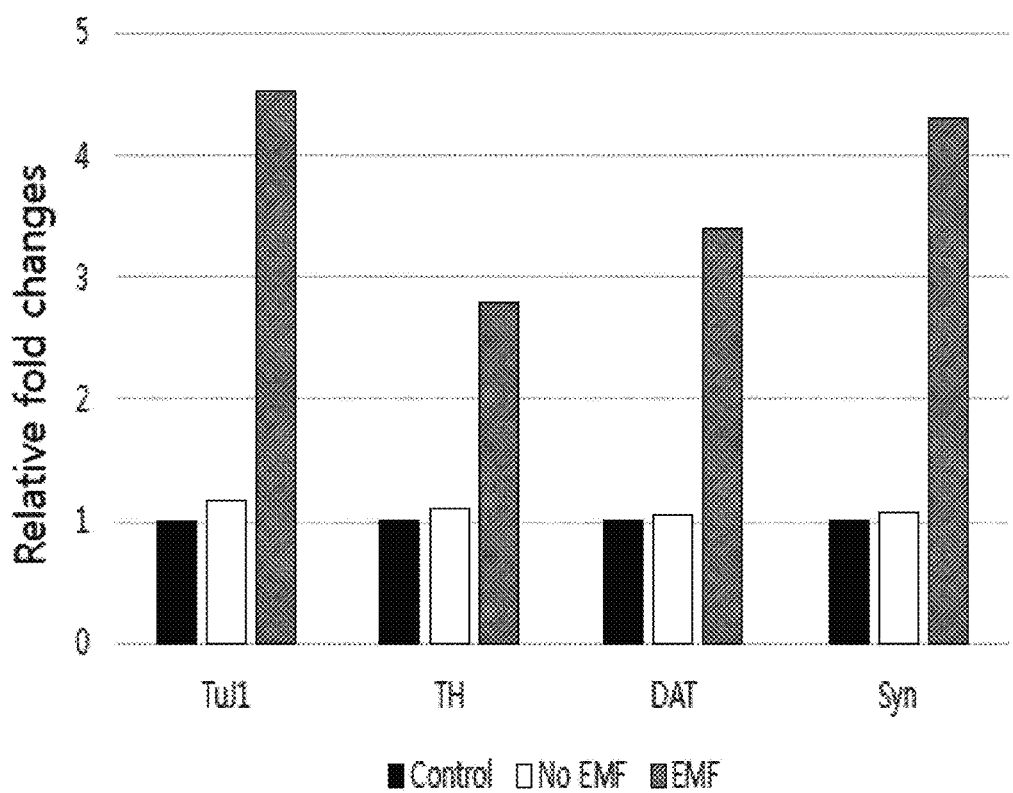
[FIG. 3]

[FIG. 4]
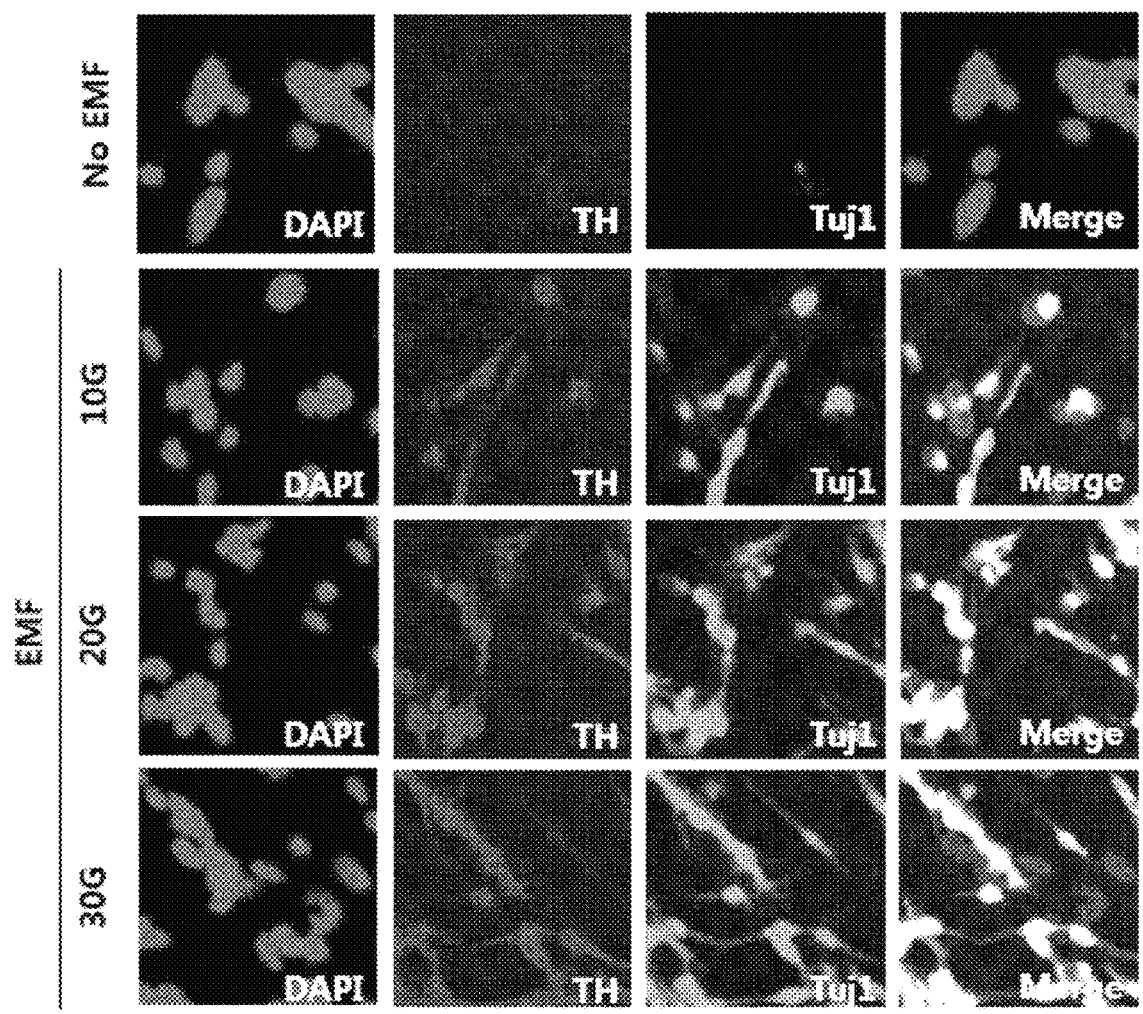

[FIG. 5]
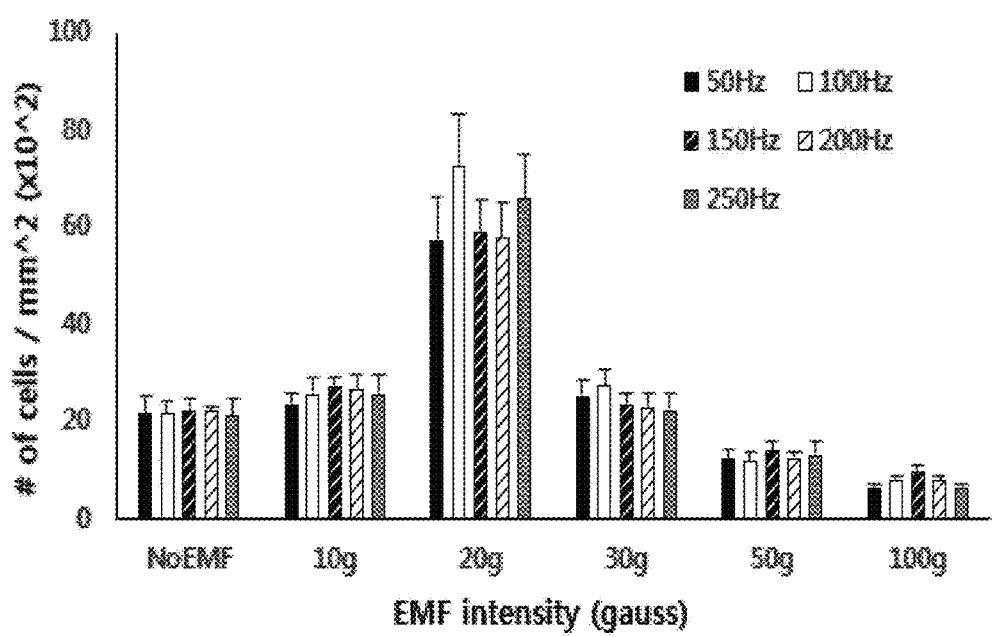

[FIG. 6]
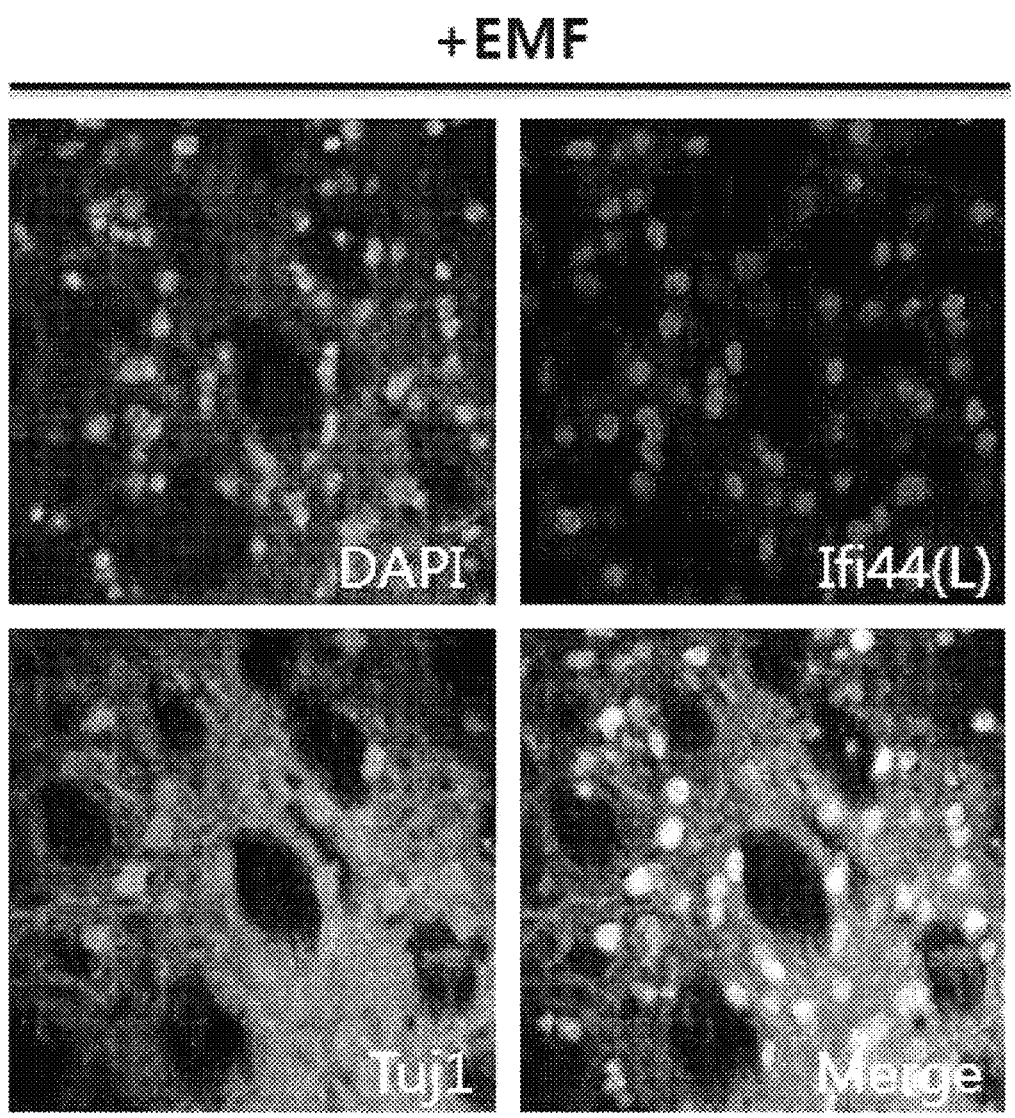

[FIGS. 7A-C]
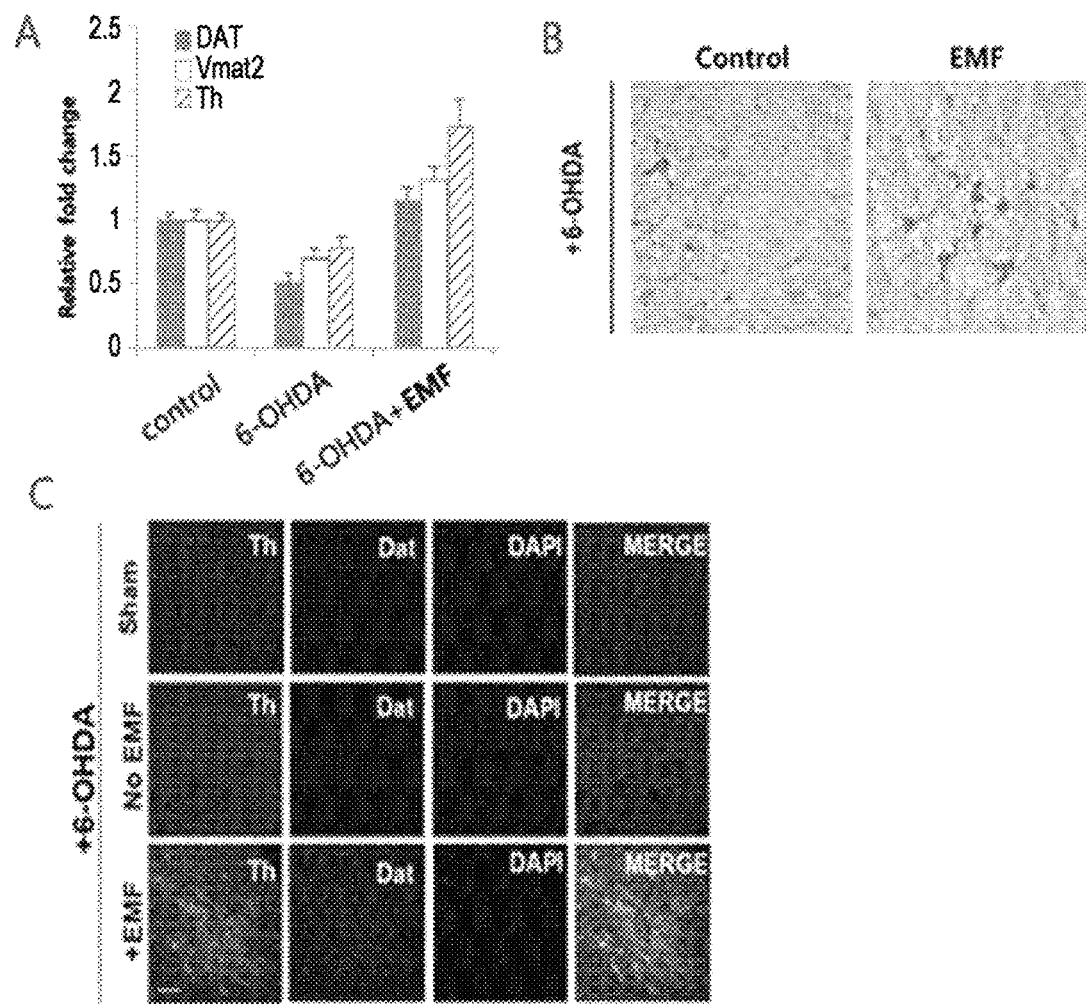

[FIG. 8]
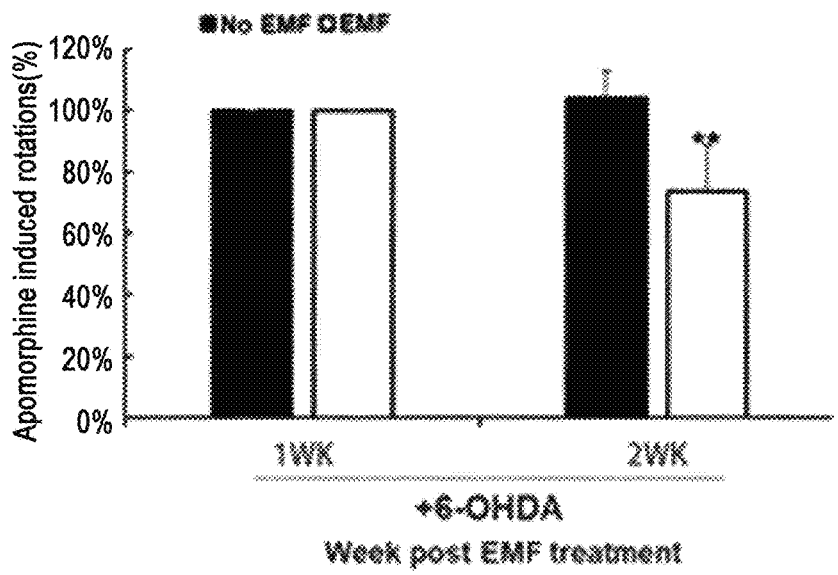
[FIG. 9]
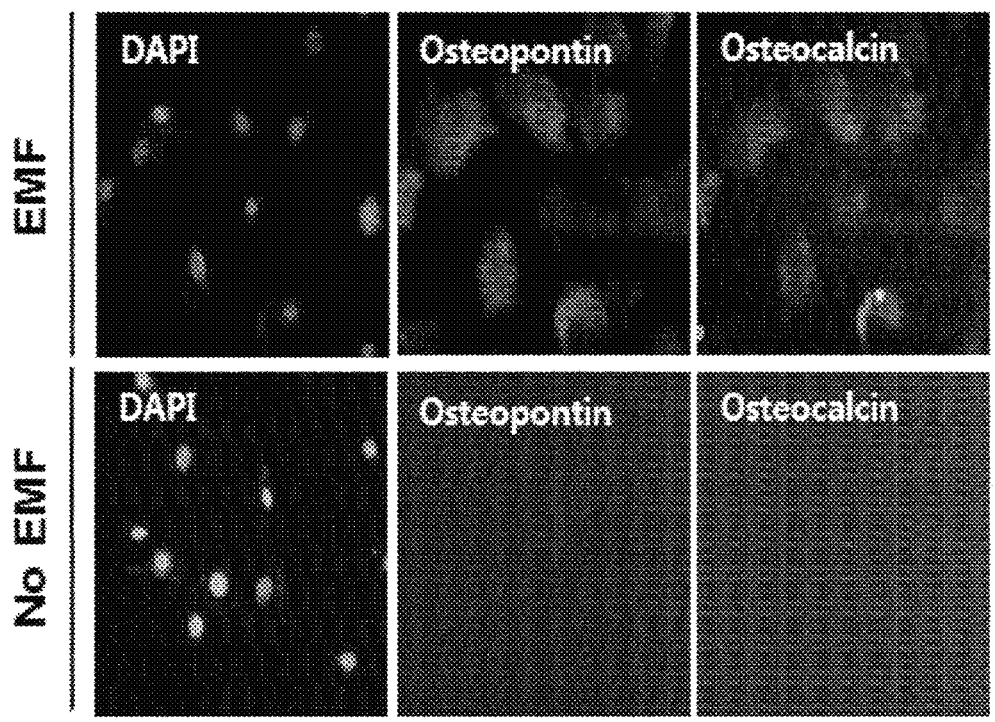

[FIG. 10]
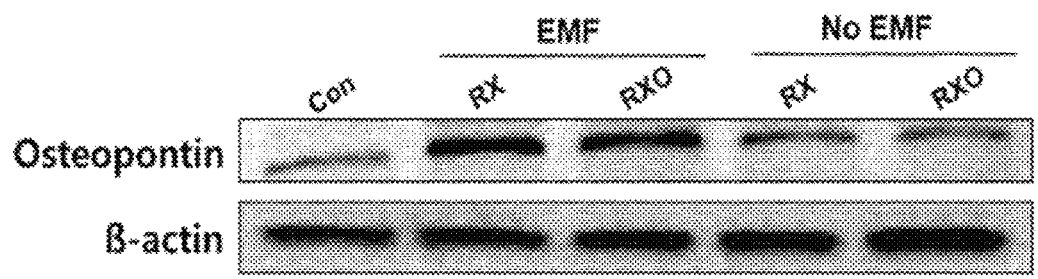

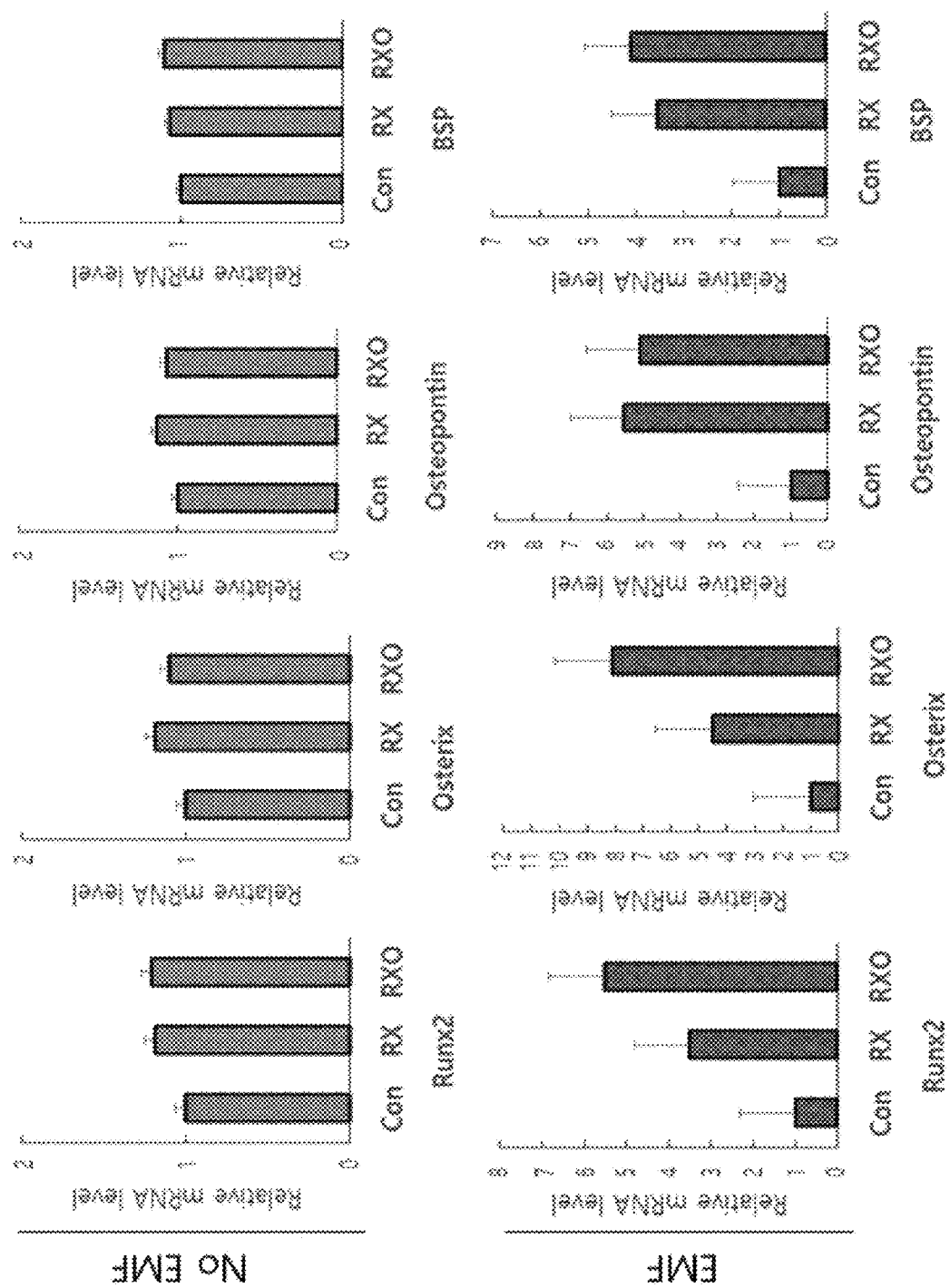
[FIG. 11]

[FIG. 12]
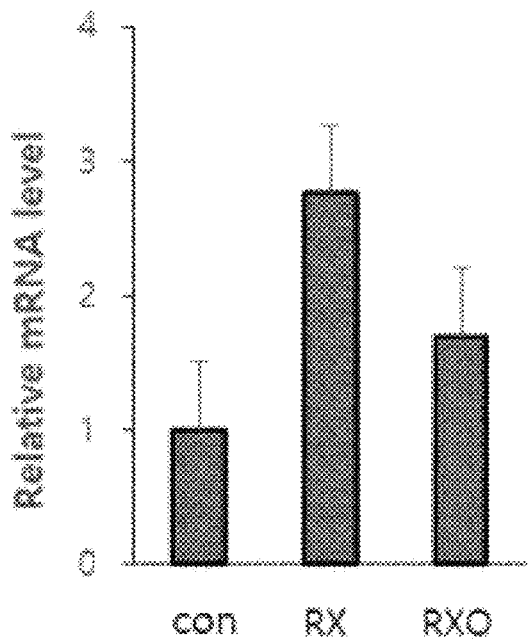
Runx2
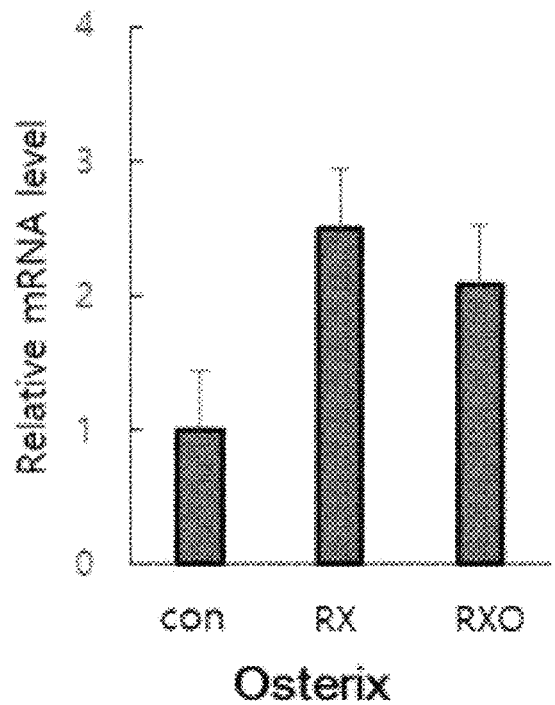
Osterix
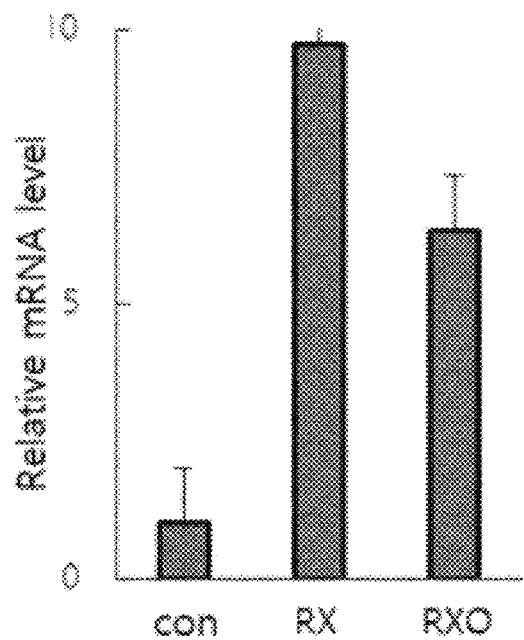
Osteopontin
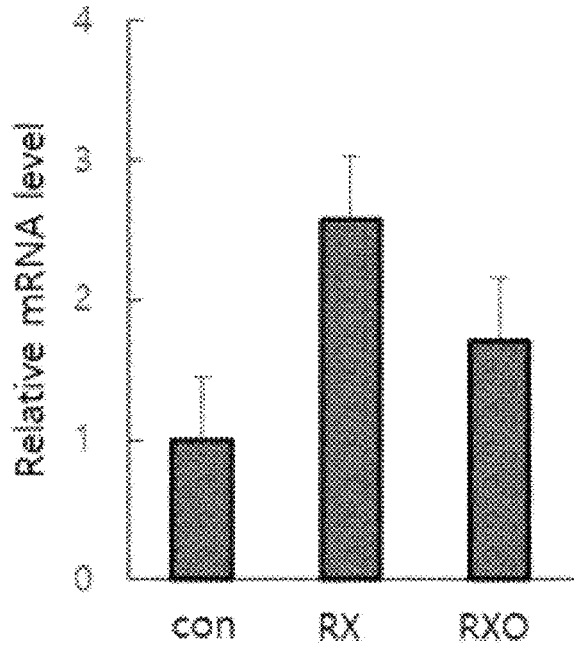
BSP

[FIG. 13]
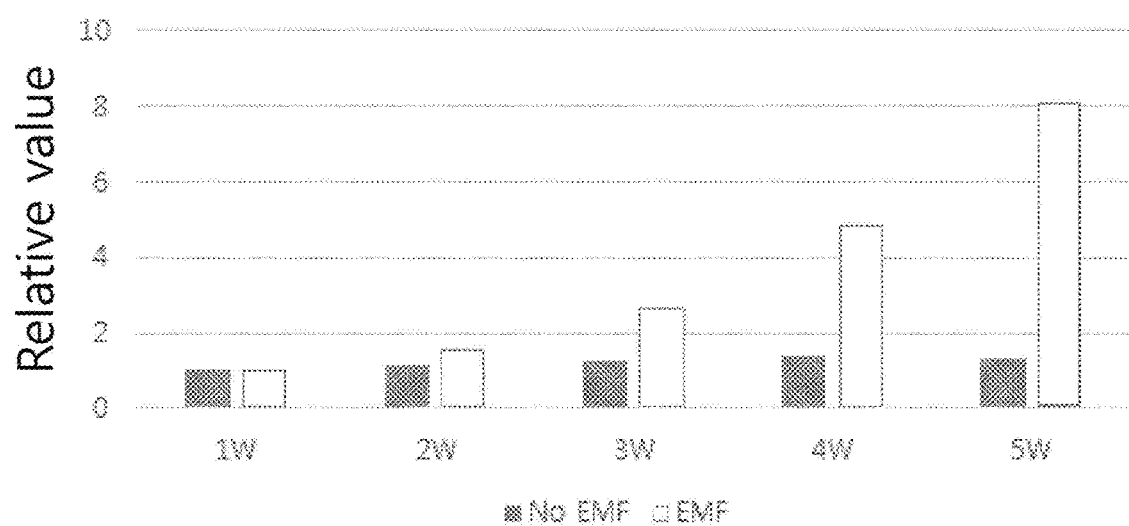

[FIGS. 14A-E]
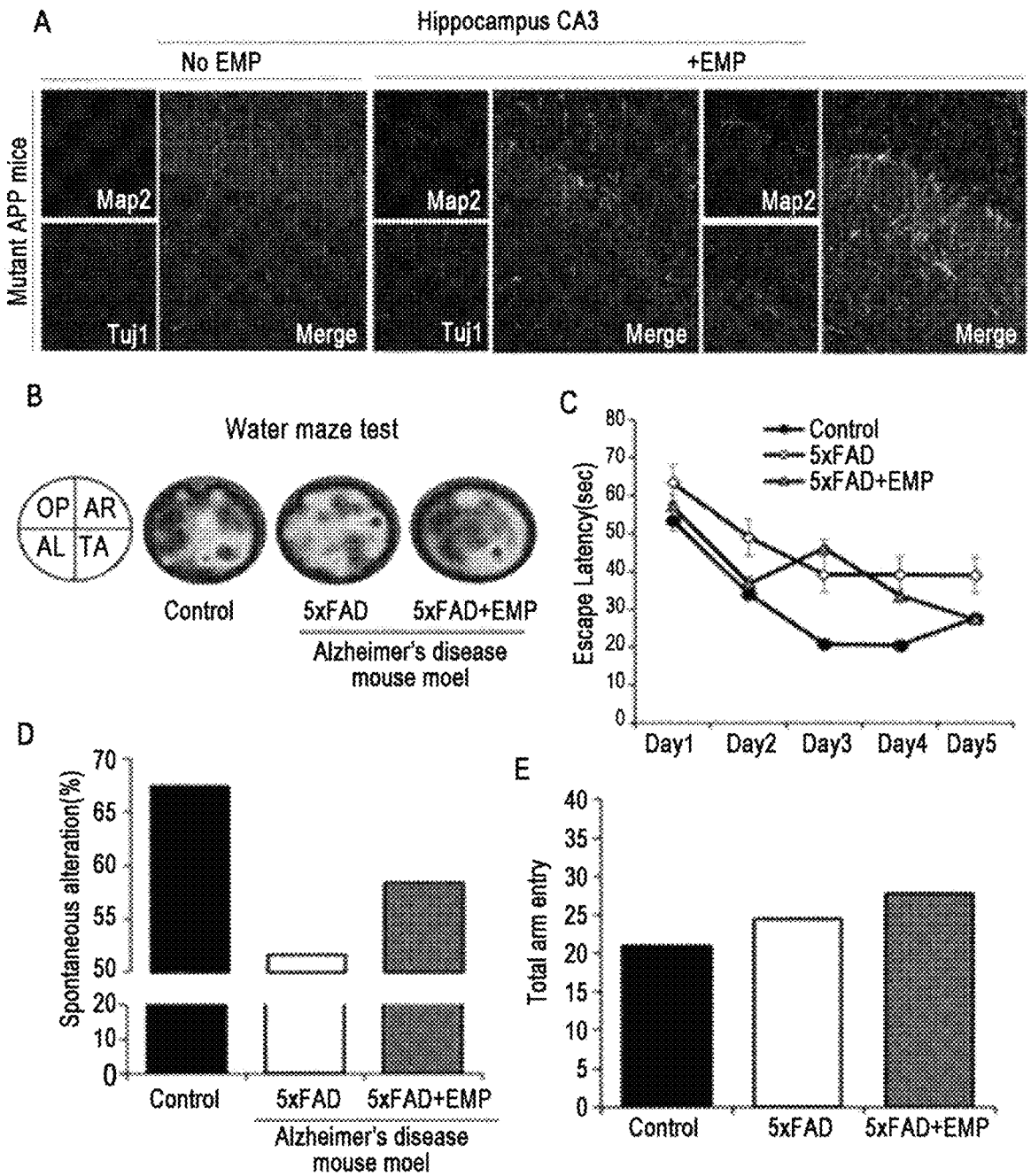

[FIGS. 15A-B]
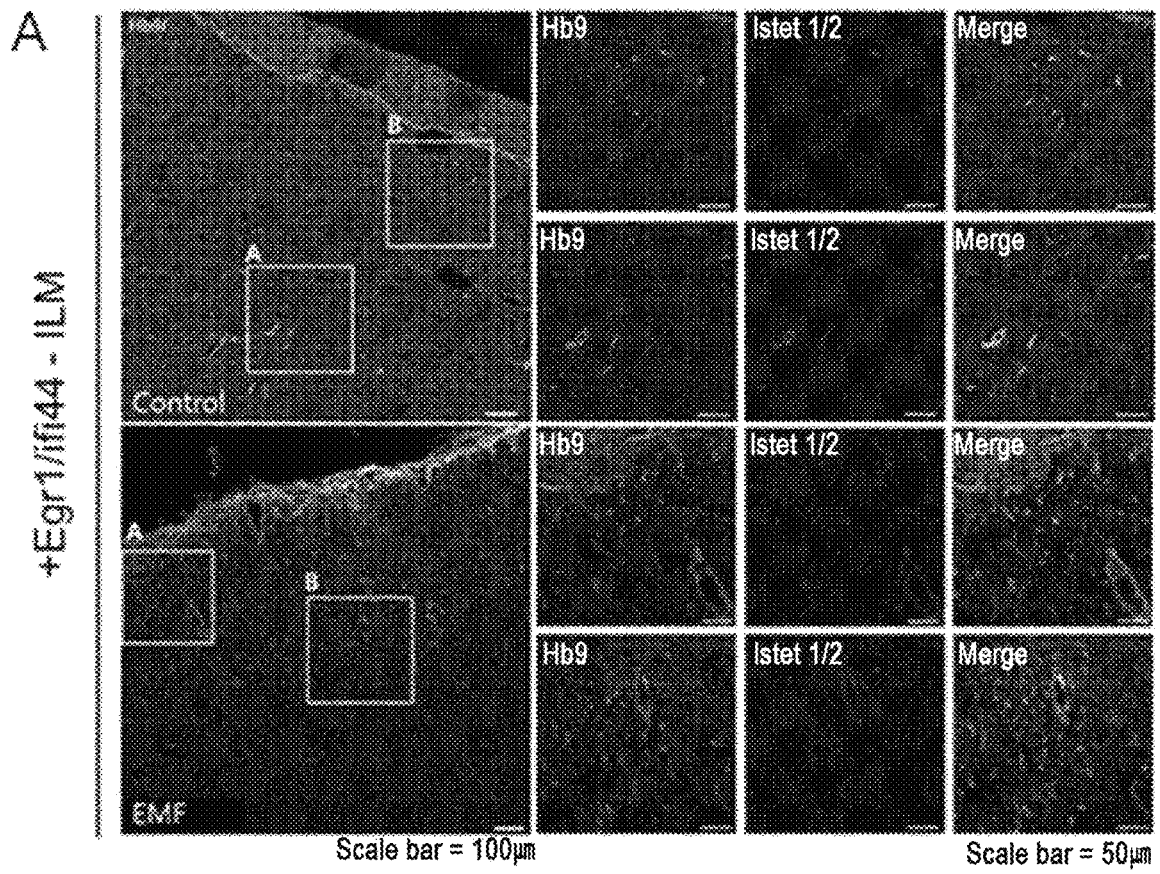
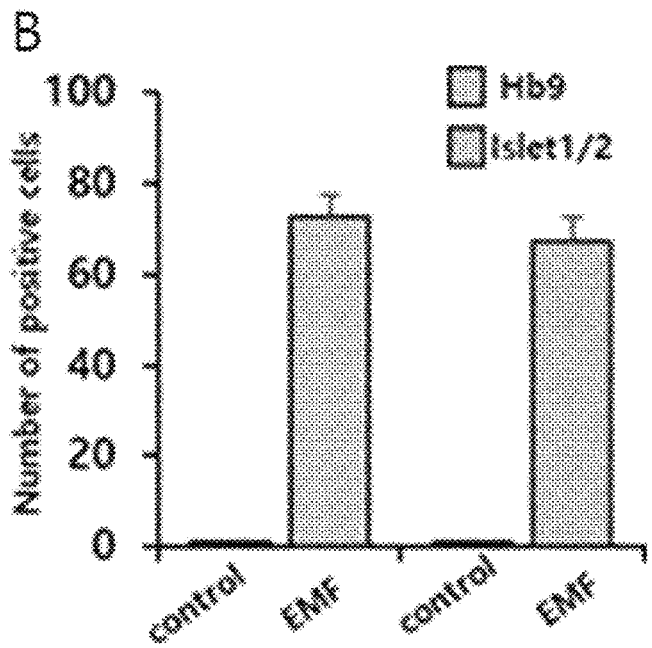

METHOD OF OVEREXPRESSING TARGET GENE USING ELECTROMAGNETIC WAVE-REACTIVE PROMOTER

This application is a national phase application under 35 U.S.C. § 371 of International Application No. PCT/KR2019/017747, filed Dec. 13, 2019, which claims priority to Korean Application No. 10-2018-0122694, filed Oct. 15, 2018. The entire text of each of the above referenced disclosures is specifically incorporated herein by reference.

INCORPORATION OF SEQUENCE LISTING

The sequence listing that is contained in the file named "HANOP0035US_ST25.txt", which is 4 KB (as measured in Microsoft Windows®) and was created on Sep. 27, 2021, is filed herewith by electronic submission and is incorporated by reference herein.

BACKGROUND OF THE INVENTION

1. Field of the Invention

The present disclosure relates to a method of overexpressing a target gene and/or a method of reprogramming cells, the method including steps of (a) introducing a vector into cells, into which vector a promoter and a target gene are inserted; and (b) applying an electromagnetic wave to the cells obtained in the step (a), and a neurological disease or bone disease therapy and other gene and cell therapies using the method.

2. Description of the Related Art

A method of expressing a target gene using a gene sequence called a promoter is the most frequently used method of overexpressing a gene. The promoter refers to all DNA nucleotide sequences to which transcriptional regulators bind, and is generally located upstream of a DNA nucleotide sequence that possesses genetic information of a gene of which transcription is to be regulated.

As the method of overexpressing a target gene using such a promoter sequence, a method of causing a modification in the promoter sequence, a method of selecting a promoter sequence that is well expressed and then introducing the corresponding sequence upstream of the target gene, etc. has been used. As the promoter sequence that is well expressed, CMV promoter, EF1a promoter, PGK promoter, U6 promoter sequence, etc. have been the most frequently used (Khan K H. "Gene Expression in Mammalian Cells and its Applications". *Advanced Pharmaceutical Bulletin.* 2013; 3(2):257-263; Norrman K, Fischer Y, Bonnamy B, Wolfhagen Sand F, Ravassard P, et al. (2010) "Quantitative Comparison of Constitutive Promoters in Human ES cells". *PLoS ONE* 5(8): e12413, etc.).

However, the method of overexpressing a gene by introducing an overexpressing promoter not only makes it difficult to turn gene expression on and off, but also makes it more impossible to regulate in vivo gene expression. These problems are regarded as the biggest problems in the application of cell differentiation, a cell conversion technology, and a cell therapy employing the gene overexpression system. To solve these problems, a method of using a promoter sequence activated by a chemical substance has been developed, but there is also difficulty in delivering the chemical substance, and there are many conditions in vivo that do not react to the corresponding substance, and thus the method is used only in a very limited way.

The present inventors have conducted research to solve the above problems, and as a result, they identified a promoter gene sequence controlled by electromagnetic wave irradiation, which had not been previously discovered, and found that a gene expression level may be regulated by controlling activity of the promoter gene sequence, thereby completing the present disclosure.

SUMMARY OF THE INVENTION

An object of the present disclosure is to provide a method of overexpressing a target gene, the method including steps of (a) introducing a vector into cells, into which vector a promoter and a target gene are inserted; and (b) applying an electromagnetic wave to the cells obtained in the step (a).

Another object of the present disclosure is to provide a method of reprogramming cells, the method including steps of (a) introducing a vector into cells, into which vector a promoter and a target gene are inserted; and (b) applying an electromagnetic wave to the cells obtained in the step (a).

Still another object of the present disclosure is to provide a differentiated cell prepared by way of the method.

Still another object of the present disclosure is to provide a pharmaceutical composition for treating or preventing a neurological disease or a bone disease, the pharmaceutical composition including, as an active ingredient, the cells prepared by way of the method.

Still another object of the present disclosure is to provide a method of treating a neurological disease or a bone disease, the method including steps of (a) introducing a vector into cells, into which vector a promoter and a target gene are inserted; and (b) obtaining differentiated cells via reprogramming by applying an electromagnetic wave to the cells obtained in the step (a).

BRIEF DESCRIPTION OF THE DRAWINGS

FIG. 1 shows a schematic illustration of a structure of a vector including EGR1 or IFI44 promoter and operation thereof by electromagnetic irradiation;

FIG. 2 shows the results of performing immunostaining of cells into which a vector including EGR1 or IFI44 promoter and GFP gene was introduced;

FIG. 3 shows the RT-PCR results of measuring expression levels of neuronal markers Tuj1, TH, DAT, and Syn (Synapsin) according to the presence or absence of an electromagnetic field (EMF) in cells into which a vector including EGR1 or IFI44 promoter and Ascl1 gene was introduced;

FIG. 4 shows immunostaining for observing changes in TH and Tuj1 expression levels according to the intensity of an electromagnetic field;

FIG. 5 shows measurement of the number of cells which were differentiated into nerve cells by applying electromagnetic fields with different intensities and frequencies;

FIG. 6 shows immunostaining for examining the results of treatment with an electromagnetic field of an intensity of 20 G and a frequency of 100 Hz;

FIGS. 7A-C show the results of producing nerve cells in a Parkinson's disease mouse model by irradiating a promoter with an electromagnetic field;

FIG. 8 shows the results of performing a mouse rotation test after producing nerve cells in a Parkinson's disease mouse model by irradiating a promoter with an electromagnetic field;

FIG. 9 shows immunostaining of osteopontin and osteocalcin, which are bone cell marker genes, according to the presence or absence of an electromagnetic field (EMF) in cells into which a vector including EGR1 or IFI44 promoter and an osteocalcin gene was introduced;

FIG. 10 shows the results of Western blotting analysis, wherein RX represents Runx2, which is a factor needed for bone cell trans-differentiation, and RXO represents Runx2 and Oct4;

FIG. 11 shows the RT-PCR results of analyzing expression levels of Runx2, Osterix and Osteoponin, and BSP, which are bone cell marker genes;

FIG. 12 shows the RT-PCR results of analyzing expression levels of Runx2, Osterix and Osteoponin, and BSP, which are bone cell marker genes;

FIG. 13 shows the result of a weekly behavior test after inducing bone cell differentiation in a mouse model by irradiating a promoter with an electromagnetic field;

FIGS. 14A-E show the experimental result of introducing a plasmid, in which Ascl1, Bm2, and Myt1 as target genes were inserted downstream of the electromagnetic wave-reactive promoter (EGR1) of the present disclosure, into an Alzheimer's disease mouse model, and then applying an electromagnetic field thereto, wherein no electromagnetic field was applied to a control group, and FIG. 14A shows the result of fluorescence staining of gene expression levels in the hippocampus region, and FIGS. 14B, 14C, and 14D show the result of a memory-related behavioral test; and FIGS. 15A-B shows the result of examining spinal cord cell formation after introducing a plasmid, in which Isl1, Lhx3, and Mnx1 as target genes were inserted downstream of the electromagnetic wave-reactive promoter of the present disclosure, into a motor cortex of the brain of a spinal cord injury model, and then applying an electromagnetic field thereto.

DETAILED DESCRIPTION OF THE PREFERRED EMBODIMENTS

The present disclosure will be described in detail as follows. Meanwhile, each description and embodiment disclosed in this disclosure may also be applied to other descriptions and embodiments. That is, all combinations of various elements disclosed in this disclosure fall within the scope of the present disclosure. Further, the scope of the present disclosure is not limited by the specific description described below.

Further, those skilled in the art will recognize, or will be able to ascertain using no more than routine experimentation, many equivalents to the specific embodiments of the disclosure described herein. Further, these equivalents should be interpreted to fall within the present disclosure.

To achieve the above objects, an aspect of the present disclosure provides a method of overexpressing a target gene, the method including steps of (a) introducing a vector into cells, into which vector a promoter and a target gene are inserted; and (b) applying an electromagnetic wave to the cells obtained in the step (a).

As used herein, the term "promoter" refers to a DNA region present near a transcription site of a target gene, including a site to which an RNA polymerase or an enhancer binds for the expression of the target gene to be linked downstream thereof.

The promoter may be EGR1 promoter or IFI44 promoter, specifically a polynucleotide including SEQ ID NO: 1 or 2, but is not limited thereto. It is obvious that any polynucleotide including SEQ ID NO: 1 or 2 with deletion, modification, substitution, or addition in part of the sequence may also be included within the scope of the present disclosure, as long as the sequence has the function of the electromagnetic wave-reactive promoter.

As used herein, the term "target gene" may be used interchangeably with "gene of interest" or "desired gene", and refers to a gene which is operably linked downstream of the promoter sequence and of which expression is regulated by the promoter. Specifically, the target gene refers to a gene of which expression is regulated by the electromagnetic wave-reactive promoter, but is not particularly limited.

As used herein, the term "operably linked" means that a nucleotide expression regulatory sequence and a nucleotide sequence encoding a desired protein are operably linked to each other to perform general functions, thereby affecting expression of the encoding nucleotide sequence. The operable linkage to the recombinant vector may be prepared using genetic recombination technology known in the art, and site-specific DNA cleavage and linkage may be prepared using restriction enzymes and ligases known in the art.

As used herein, the term "vector" refers to a gene construct including an essential regulatory element operably linked so that a gene insert is expressed.

The vector of the present disclosure includes expression regulatory elements, such as a promoter, an operator, an initiation codon, a termination codon, a polyadenylated signal, and an enhancer, as well as a signal sequence or a leader sequence for membrane targeting or secretion, and may be variously prepared depending on the purposes. The vector may include a viral vector, an episomal vector, a plasmid vector, a cosmid vector, etc., but is not limited thereto.

Specifically, the viral vector may include vectors derived from lentivirus, retrovirus, for example, human immunodeficiency virus (HIV), murine leukemia virus (MLV), avian sarcoma/leukosis (ASLV), spleen necrosis virus (SNV), Rous sarcoma virus (RSV), mouse mammary tumor virus (MMTV), etc., adenovirus, adeno-associated virus, herpes simplex virus, etc. More specifically, the viral vector may be an RNA-based viral vector, but is not limited thereto.

The episomal vector of the present disclosure is a non-viral, non-integrating vector, and is known to express a gene included in the vector without being integrated into the chromosome. With respect to the objects of the present disclosure, cells including the episomal vector may include all cases in which the episomal vector is integrated into the genome or exists in the cells without being integrated into the genome.

As used herein, the step of (a) introducing a vector into cells, into which vector a promoter and a target gene are inserted, means that the vector including the target gene is introduced into the cells to allow the target gene to express in the cells.

The gene may be in the form of DNA or RNA, and as long as the gene may be expressed in cells, it may be integrated into and placed in the chromosome of the cells, it may exist extrachromosomally, or it may be in any of the cases. Further, the target gene may be introduced in any form, as long as it may be introduced into cells and expressed therein. For example, the target gene may be introduced into cells in the form of an expression cassette, which is a gene construct including all elements required for its autonomous expression. Commonly, the expression cassette includes the promoter of the present disclosure which is operably linked to the target gene, transcriptional termination signals, ribosome binding sites, and translation termination signals. The expression cassette may be in the form of a self-replicable expression vector. Also, the target gene as it is may be introduced into cells and operably linked to sequences required for expression in cells, but is not limited thereto.

The cells of the present disclosure may be appropriately selected by those skilled in the art according to the kind of the target gene to be overexpressed.

The "electromagnetic field" of the present disclosure is a phenomenon in which an electromagnetic field, the intensity of which periodically changes, propagates through space, and has the same meaning as an electromagnetic wave. The electromagnetic field used in the present disclosure may include both a pulse wave form and a continuous wave (sine wave) form. With respect to the objects of the present disclosure, "electromagnetic field treatment" and "application of electromagnetic waves" may be used interchangeably.

In the present disclosure, a frequency of the electromagnetic field may be 30 Hz to 500 Hz, specifically 50 Hz to 300 Hz, but is not limited thereto.

In the present invention, an intensity of the electromagnetic field may be 5 Gauss (G) to 50 Gauss (G), specifically 10 G to 30 G, but is not limited thereto.

In one embodiment of the present disclosure, expression of target genes involved in cell differentiation was examined by applying an electromagnetic wave having a frequency of 50 Hz or more and 300 Hz or less while changing the intensity of the electromagnetic wave to 10 G, 20 G, or 30 G, and as a result, it was observed that the highest cell differentiation occurred at 10 G to 20 G, and 50 Hz or more and 250 Hz or less (FIG. 5).

Another aspect of the present disclosure provides a method of reprogramming cells, the method including steps of (a) introducing a vector into cells, into which vector a promoter and a target gene are inserted; and (b) applying an electromagnetic wave to the cells obtained in the step (a). The promoter, the target gene, and the vector are the same as described above.

The "step of obtaining cells by introducing the vector" may be introducing the vector into isolated cells.

As used herein, the term "isolated cells" may specifically refer to, but is not particularly limited to, cells whose lineage has already been specified, such as germ cells, somatic cells, or progenitor cells. Examples thereof may include cells derived from humans, but cells derived from many different individuals may also be included in the scope of the present disclosure.

Further, the isolated cells of the present disclosure may include both in vivo and in vitro cells, and specifically, may be cells isolated in vivo.

The "somatic cells" refer to all cells that constitute animals and plants, excluding germ cells, of which differentiation has completed, and the "progenitor cells" refer to parent cells that have their differentiation fate while not expressing differentiation traits, when cells corresponding to the progeny are revealed to express specific differentiation traits. For example, with regard to nerve cells (neurons), neuroblasts (neuron stem cells) correspond to progenitor cells, and with regard to myotube cells, myoblasts correspond to progenitor cells.

The target gene may be a gene used in cell reprogramming. Specifically, the target gene may be a gene involved in direct trans-differentiation of cells. More specifically, the target gene may be a factor that may cause direct trans-differentiation into nerve cells or bone cells. Much more specifically, the target gene may be any one or more selected from the group consisting of Ascl1, Nurr1, Pitx3, Lmx1, Runx2, and Osterix, but is not limited thereto.

As used herein, the term "reprogramming" is used interchangeably with "cell fate conversion", and refers to a method of conversion into target cells by controlling global gene expression patterns possessed by specific cells. In other words, in the present disclosure, reprogramming refers to a method of artificially manipulating the fate of cells to convert the cells into cells having completely different characteristics, and with respect to the objects of the present disclosure, the reprogramming may be performed by introducing a vector including a foreign gene or another gene into coils. The reprogramming may refer to cell differentiation, dedifferentiation, direct reprogramming (or direct conversion), or direct trans-differentiation.

As used herein, the term "direct reprogramming" is distinguished from a technology of producing induced pluripotent stem cells having pluripotency through a reprogramming process, and is a technology that induces direct conversion into target cells through reprogramming culture. In order to produce target cells using the existing technology of reprogramming induced pluripotent stem cells, induced pluripotent stem cells are first produced from isolated somatic cells, and intermediate coils must be produced depending on target cells. Since such complicated production and culture processes must be sequentially performed, there are disadvantages of low production efficiency and high consumption of time and cost. In addition, since cells are naturally produced via pluripotent stem cells, there are problems in that it is necessary to verify whether undifferentiated cells remain and whether safety is secured. However, the present disclosure may provide an alternative capable of overcoming the problems of the above technology, such as production time, cost, efficiency, and safety, by directly producing target cells from initial cells through the direct reprogramming technology. The "direct reprogramming" of the present disclosure may be used interchangeably with direct dedifferentiation, direct differentiation, direct conversion, direct trans-differentiation, trans-differentiation, etc. The direct reprogramming may particularly mean conversion into nerve cells or bone cells.

In one embodiment of the present disclosure, a vector including the promoter of the present disclosure was prepared by using Ascl1, Nurr1, Pitx3, and Lmx1 as target genes, and the corresponding vector was introduced into somatic cells, followed by electromagnetic wave irradiation. As a result, differentiation into nerve cells was observed (Example 3). In another embodiment of the present disclosure, a vector including the promoter of the present disclosure was prepared by using Runx2 and Osterix as target genes, and the corresponding vector was introduced into somatic cells, followed by electromagnetic wave irradiation. As a result, differentiation into bone cells was observed (Example 4).

Still another aspect of the present disclosure provides a differentiated cell prepared by the above method. The differentiated cell may be a bone cell or a nerve cell, but is not limited thereto.

Still another aspect of the present disclosure provides a pharmaceutical composition for treating or preventing a neurological disease or a bone disease, the pharmaceutical composition including, as an active ingredient, the cells prepared by the above method.

Still another aspect of the present disclosure provides a method of treating a neurological disease or a bone disease, the method including steps of (a) introducing a vector into cells, into which vector a promoter and a target gene are inserted; and (b) obtaining differentiated cells via reprogramming by applying an electromagnetic wave to the cells obtained in the step (a).

As used herein, the term "neurological disease" refers to a disease caused by deformation or loss of nerve cells or nerve tissues, and may include Parkinson's disease, Alzheimer's disease, Pick's disease, Huntington's disease, amyotrophic lateral sclerosis, an ischemic cerebral disease (stroke), a demyelinating disease, multiple sclerosis, epilepsy, a degenerative neurological disease, spinal cord injury (SCI), etc., but is not limited thereto. The neurological disease includes diseases of which therapeutic or improvement effects are expected by reprogramming into nerve cells, for example, degenerative diseases or traumatic diseases, without limitation.

In one embodiment of the present disclosure, when factors involved in nerve cell differentiation were overexpressed using the vector including the promoter of the present disclosure, conversion into nerve cells was observed, indicating that a nerve tissue may be produced in an individual with the neurological disease (Examples 3 and 5).

As used herein, the term "bone disease" includes all diseases that may be caused by decreased bone density, and may refer to a disease caused by deformation or loss of bone cells or bone tissue, and specifically, may include osteoporosis, rheumatoid arthritis, periodontal disease, osteomalacia, osteogenesis imperfecta, osteopetrosis, osteosclerosis, Paget's disease, adynamic bone disease, metabolic bone disease, rickets, etc., but is not limited thereto. The bone disease includes diseases of which therapeutic or improvement effects are expected by reprogramming into bone cells, for example, degenerative diseases or traumatic diseases, without limitation.

In one embodiment of the present disclosure, when factors involved in bone cell differentiation were overexpressed using the vector including the promoter of the present disclosure, conversion into bone cells was observed, indicating that a bone tissue may be produced in an individual with the bone disease (Example 4).

The above results suggest that somatic cells may be converted into other cells by overexpressing the target genes using the promoter of the present disclosure and electromagnetic field application, and is not limited to the above exemplified diseases, and it is obvious that the therapeutic method of the present disclosure may be applied to any disease, as long as it is a disease caused by loss of cells constituting a particular tissue and tissue injury resulting therefrom.

As used herein, the term "treatment" means all of the actions by which the diseases have taken a turn for the better or been modified favorably.

As used herein, the term "prevention" means all of the actions by which occurrence of the diseases is restrained or retarded.

The composition may include a pharmaceutically acceptable carrier.

The "pharmaceutically acceptable carrier" refers to a carrier or diluent that does not cause irritation to an organism and does not abrogate biological activity and properties of an injected compound. The kind of the carrier applicable in the present disclosure is not particularly limited, and any pharmaceutically acceptable carrier commonly used in the art may be used. Non-limiting examples of the carrier may include saline, sterile water, Ringer's solution, buffered saline, an albumin injection solution, a dextrose solution, a maltodextrin solution, glycerol, ethanol, etc. These carriers may be used alone or in a combination of two or more thereof.

The composition including a pharmaceutically acceptable carrier may be in various oral or parenteral formulations. When formulated, the formulations are prepared using diluents or excipients such as fillers, extenders, binders, humectants, disintegrants, surfactants, etc. which are commonly used.

Specifically, solid formulations for oral administration may include tablets, pills, powders, granules, capsules, etc. These solid formulations may be prepared by mixing the above compound with at least one excipient, for example, starch, calcium carbonate, sucrose, lactose, gelatin, etc. In addition to simple excipients, lubricants, such as magnesium stearate and talc, may also be used, Liquid formulations for oral administration may include suspensions, solutions for internal use, emulsions, syrups, etc. In addition to the simple diluents commonly used, such as water and liquid paraffin, various other excipients, such as humectants, sweeteners, fragrances, preservatives, etc., may also be included. Formulations for parenteral administration may include sterile aqueous solutions, non-aqueous solvents, suspensions, emulsions, lyophilized preparations, and suppositories. As the non-aqueous solvents and the suspensions, propylene glycol, polyethylene glycol, vegetable oil such as olive oil, an injectable ester such as ethyl oleate, etc. may be used. As a base for suppositories, Witepsol, Macrogol, Tween 61, cacao butter, laurin butter, glycerogelatin, etc. may be used.

Hereinafter, the present disclosure will be described in more detail with reference to Examples and Experimental Examples. However, these Examples and Experimental Examples are for illustrative purposes only, and the scope of the present disclosure is not intended to be limited by these Examples and Experimental Examples.

Example 1

Preparation of Vector

EGR1 promoter or IFI44 promoter was inserted into a vector construct to be used in each of the following exemplary embodiments.

A target gene used in each exemplary embodiment was introduced into the vector construct such that each promoter was allowed to affect the target gene. The structure of the vector construct thus prepared is shown in FIG. 1.

Example 2

Verification of GFP Gene Expression Regulation Using Electromagnetic Wave—Reactive Promoter To examine whether each promoter regulated expression by application of electromagnetic waves, GFP gene expression was examined.

In detail, a vector was constructed using GFP gene as a target gene in the same manner as in Example 1. The constructed vector was introduced into lentivirus, which was then introduced into skin cells. DAPI staining was performed as counterstaining, and as a control group, pGL3-Basic vector (Fromega, plasmid E1751) was used. An electromagnetic field of 20 G and 100 Hz was applied to each cell for 24 hours. Thereafter, immunostaining was performed, and the experimental results are shown in FIG. 2.

As an experimental result, GFP expression was hardly observed in the control group, whereas GFP expression was observed in the experimental group using the EGR1 promoter or the IFI44 promoter.

This result indicates that EGR1 or IFI44 promoter may be activated by application of electromagnetic waves.

Example 3

Direct Trans Differentiation into Nerve Cells Using Electromagnetic Wave—Reactive Promoter Example 3-1: Verification of Nerve Cell Preparation Ascl1, Nurr1, Pitx3, and Lmx1a, which are genes to be overexpressed for reprogramming of somatic cells into nerve cells, were used as target genes to prepare a vector in the same manner as in Example 1, which was then introduced into skin-derived fibroblasts. An electromagnetic field of 20 G and 100 Hz was applied, and then expression of neuronal markers was measured by RT-PCR. The RT-PCR results are shown in FIG. 3.

As an experimental result, when the electromagnetic waves were applied, expression of neuronal markers Tuj1, TH, DAT, and Synapsin was found to greatly increase.

This result indicates that reprogramming may be induced by regulating the promoter activity with application of electromagnetic waves to thereby prepare nerve cells.

Example 3-2: Measurement of Optimal Intensity of Electromagnetic Waves

To investigate an optimal intensity of electromagnetic waves for each gene of the EGR1 and IFI44 promoters, electromagnetic waves of different intensities and frequencies were applied, and then expression levels of target genes were examined.

In detail, a vector and somatic cells were prepared in the same manner as in Example 3-1, and then changes in the gene expression according to changes in the intensity of electromagnetic waves were examined by immunostaining while changing the intensity of electromagnetic waves at 10 G, 20 G, and 30 G. The results of immunostaining are shown in FIG. 4.

As a result of the immunostaining, when no electromagnetic field was applied, expression of TH and Tuj1 was not observed. However, as the intensity of the exposed electromagnetic field was increased to 10 G, 20 G, and 30 G, neuronal markers were strongly observed. However, when the electromagnetic wave of 30 G was applied, there was a slight change in the cell morphology.

This result indicates that the optimal intensity of electromagnetic waves for the EGR1 promoter and IFI44 promoter was 30 G or less.

Example 3-3: Verification of Direct Trans-Differentiation into Nerve Celis in Vivo An experiment was performed to examine whether reprogramming of somatic cells into nerve cells also occurs in vivo by applying an electromagnetic wave to the EGR1 and IFI44 promoters.

In detail, the plasmid prepared in Example 3-1 was introduced into the midbrain of an animal model into which a Parkinson's disease-inducing drug, 6-OHDA, was injected, and an electromagnetic field of 20 G and 100 Hz was applied, and then expression levels of Th and Dat, which are dopamine neuron markers, were examined by RT-PCR and immunostaining.

As an experimental result, expression levels of dopamine neuron markers were greatly increased in the experimental group to which the electromagnetic field was applied, and successful production of nerve cells was observed in the mouse model (FIGS. 7A to 7C).

This result indicates that somatic cells may also be differentiated into nerve cells in vivo by applying the electromagnetic wave to the promoter of the present disclosure.

Example 3-4: Verification of Effect of Ameliorating Nerve Cell Injury by Facilitating Reprogramming into Nerve Cells In Vivo An experiment was performed using the results of Examples 3-1 to 3-3 to examine the therapeutic effect on nerve cell injury in a mouse model.

In detail, the plasmid prepared in Example 3-1 was introduced into an animal model into which a Parkinson's disease-inducing drug, 6-OHDA, was injected, and an electromagnetic field of 20 G and 100 Hz was applied; behavioral changes of the mouse were then analyzed by way of a mouse rotary test, and the results are shown in FIG. 8.

As a result, it was confirmed that when an EMF was applied, a reduction rate of the rotational behavior of the mouse increased over time.

This result indicates that the method of applying an electromagnetic wave to the promoter of the present disclosure may be used for treating and ameliorating a disease caused by nerve cell injury.

Example 4

Reprogramming into Bone Cells Using Electromagnetic Wave—Reactive Promoter

Example 4-1: Verification of Reprogramming into Bone Cells

An experiment was performed to examine whether reprogramming of somatic cells into bone cells occurred due to irradiation of EGR1 and IFI44 promoters with an electromagnetic wave.

In detail, Runx2 and Osterix, which are genes to be overexpressed for reprogramming of somatic cells into bone cells, were used as target genes to prepare a vector and a lentivirus in the same manner as in Example 1. The vector was introduced into somatic cells using the prepared virus, and an electromagnetic field was applied. After applying the electromagnetic field, immunostaining and RT-PCR analysis for osteopontin and osteocalcin, which are bone cell markers, were performed in each cell, and the results are shown in FIGS. 9 to 12.

As an experimental result, when the electromagnetic wave was applied, expression of bone cell markers was found to greatly increase.

This result indicates that reprogramming may be induced by regulating the promoter activity with application of electromagnetic waves to thereby prepare bone cells.

Example 4-2: Verification of Effect of Ameliorating Symptoms of Bone Disease by Facilitating Direct Trans-Differentiation into Bone Cells in Vivo An experiment was performed using the results of Example 4-1 to examine the therapeutic effect on bone cell injury in a mouse model.

In detail, a vector was prepared and introduced as in Example 4-1, an electromagnetic field was applied, and then expression of Runx2, which is a bone cell gene, was quantitatively analyzed by RT-qPCR. As a result, it was confirmed that when the electromagnetic field was applied, the expression level of Runx2, which is a bone marker gene, increased over time (FIG. 13).

This result indicates that direct trans-differentiation may be induced by regulating the promoter activity with application of electromagnetic waves to thereby prepare bone cells, and thus the method of applying an electromagnetic wave to the promoter of the present disclosure may be used for treating a bone disease.

Example 5

Amelioration of Cell Damage Using Reprogramming In Vivo, and Additional Verification of Therapeutic Effect Thereof on Diseases Based on the results confirmed in Examples 3 and 4, it was additionally examined whether irradiation of the EGR1 and IFI44 promoters with an electromagnetic wave exhibited therapeutic effects on diseases through amelioration of cell damage.

Example 5-1: Verification of Therapeutic Effect on Alzheimer's Disease

To verify the therapeutic effect on Alzheimer's disease, mutation APP and 5XFAD mouse models were used.

A plasmid, in which Ascl1, Brn2, and Myt1 as target genes were inserted downstream of the electromagnetic wave-reactive promoter (EGR1) of the present invention, was introduced into the hippocampus region of the mouse model. Next, an electromagnetic field of 20 G and 100 Hz was applied for one week. Thereafter, gene expression levels in the hippocampus region of the mouse were examined by fluorescence staining, and shown in FIG. 14. The result of a memory-related behavioral test is shown in FIG. 15.

As an experimental result, expression of induced nerve cell markers Map2 and Tuj1 in the control mouse was the same as in the disease mouse model. However, expression of nerve cell markers was greatly increased in the experimental group, in which cell conversion was induced by applying an electromagnetic field (FIG. 14A). The result of the memory-related behavioral test also showed that great improvement was observed in the experimental group to which the electromagnetic field was applied (FIGS. 14B to 14D).

Therefore, it was demonstrated that when differentiation into nerve cells is induced by reprogramming using the promoter of the present disclosure, it is possible to improve or treat Alzheimer's disease.

Example 5-2: Verification of Therapeutic Effect on Spinal Cord Injury (SCI)

An experiment was performed to verify the therapeutic effect on spinal cord injury.

In detail, spinal cord injury was induced in a mouse model, and then a plasmid, in which the electromagnetic wave-reactive promoter of the present invention and Isl1, Lhx3, and Mnx1 as target genes were inserted, was introduced into the motor cortex of the mouse brain. Thereafter, an electromagnetic field of 20 G and 100 Hz was applied for one week. Next, immunostaining was performed to examine whether spinal cord cells were successfully produced, and the result is shown in FIG. 15.

As an experimental result, it was confirmed that motor neuron marker Hb9 antibody and Islet1/2 gene-expressing cells were observed in the mouse model to which the electromagnetic field was applied.

Therefore, it was demonstrated that production of nerve cells may be induced by reprogramming using the promoter of the present disclosure to thereby improve and treat spinal cord injury.

Taking together the results of Examples 3 to 5, it can be seen that the reprogramming method using the promoter of the present disclosure may be applied to treatment, improvement, and prevention of various diseases caused by cell injury.

Based on the above description, it will be understood by those skilled in the art that the present disclosure may be implemented in a different specific form without changing the technical spirit or essential characteristics thereof. In this regard, it should be understood that the above embodiment is not imitative, but illustrative in all aspects. The scope of the disclosure is defined by the appended claims rather than by the description preceding them, and therefore all changes and modifications that fall within metes and bounds of the claims, or equivalents of such metes and bounds, are therefore intended to be embraced by the claims.

EFFECT OF THE INVENTION

When a promoter of a specific gene which is reactive to electromagnetic wave irradiation of the present disclosure is used, it is possible to artificially regulate expression levels of desired target genes and to regulate expression of the target genes until a desired predetermined time.

It is also possible to regulate expression of specific target genes in vivo and in vitro, and through this expression regulation, differentiation and reprogramming into desired cells may be achieved, which may be applied to cell therapy technologies and cell therapy agents.

When the above expression regulation is applied to cell therapy technologies, gene overexpression may be induced in a non-invasive manner using a physical electromagnetic field, and thus efficient treatment may be induced with safety and fewer side-effects. Moreover, changes of cells may be artificially regulated until a desired cell culture stage, and thus, even when the treatment is completed, the nerve regeneration effect may be controlled according to the degree of treatment by simply removing the electromagnetic field.

What is claimed is:

1. A method of overexpressing a target gene, the method comprising steps of:
   (a) introducing a vector into cells, into which vector a promoter and a target gene are inserted; and
   (b) applying an electromagnetic wave of a frequency of a range from 50 Hz to 300 Hz to the cells obtained in the step (a), wherein the promoter is IFI44 promoter.

2. The method of claim 1, wherein the vector includes SEQ ID NO: 2.

* * * * *

SEQUENCE LISTING

<160> NUMBER OF SEQ ID NOS: 2

<210> SEQ ID NO 1
<211> LENGTH: 820
<212> TYPE: DNA
<213> ORGANISM: Artificial sequence

```
<220> FEATURE:
<223> OTHER INFORMATION: Synthetic nucleic acid (EGR1)

<400> SEQUENCE: 1
agccgccgcg cgcccagctc tacgcgcctg gcgccctccc cacgcgggcg tccccgactc      60
ccgcgcgcgc tcaggctccc agttgggaac caaggagggg gaggatgggg ggggggggtg     120
tgcgccgacc cggaaacgcc atataaggag caggaaggat cccccgccgg aacagacctt     180
atttgggcag cgccttatat ggagtggccc aatatggccc tgccgcttcc ggctctggga     240 ggagggggcga gcgggggttg gggcgggggc aagctgggaa ctccaggcgc ctggcccggg     300
aggccactgc tgctgttcca atactaggct ttccaggagc ctgagcgctc gcgatgccgg     360
agcgggtcgc agggtggagg tgcccaccac tcttggatgg gagggcttca cgtcactccg     420
ggtcctcccg gccggtcctt ccatattagg gcttcctgct tcccatatat ggccatgtac     480
gtcacggcgg aggcgggccc gtgctgttcc agacccttga aatagaggcc gattcgggga     540
gtcgcgagag atcccagcgc gcagaacttg gggagccgcc gccgcgattc gccgccgccg     600
ccagcttccg ccgccgcaag atcggcccct gccccagcct ccgcggcagc cctgcgtcca     660
ccacgggccg cggctaccgc cagcctgggg gcccacctac actccccgca gtgtgccccct     720 gcaccccgca tgtaacccgg ccaaccccgg cgagtgtgc cctcagtagc ttcggcccccg     780 ggctgcgccc accacccaac atcagttctc cagctcgctg                           820

<210> SEQ ID NO 2
<211> LENGTH: 1014
<212> TYPE: DNA
<213> ORGANISM: Artificial sequence
<220> FEATURE:
<223> OTHER INFORMATION: Synthetic nucleic acid (IFI44)

<400> SEQUENCE: 2
ctctcactcc attcaggaca cttctccaat gacatctcat tagatagacc tttcctgatt      60
atgctgtcta aagtaggaga tttcttccca catcactcct attcctcctc tttttctcac     120
ttaatactcc aaaactctgt ttatttactt gaaaagtggc aataatattg gtgtcctcat     180
cataaagtta ttaaaataaa cacacgagat acatgtaaat tgtcttgcaa ataatgtcta     240
taataatata atttttaaag ccaagtatat aatacctcat aagctgctta aaatattttt     300
atttgatgat gctattgttt ttaatagggc cagcaaatta aaaaaacctt tttagggcag     360
gcaggtaatt taaattttttt agaaccagtc aggtataaag caagagggga caaggagga     420 ctggagagtg gatgcccaat gatataaaag cattcacgtt caacaattaa aaactataaa     480
gacattacat tggccctaca gaacaaatgt gcggattgaa ttctgcctat aggacacgaa     540
tttatgatcc ttagcaatgt gaagttagag aagggggtttt attgtgaaat tgacacaggt     600
tgttttatat cttataaatg aagtctcctc attttcctgt ggtcagaaga gaggggggcaa     660 gcagaaaagc agaggaacaa atttggaggc taaaataaca ttctacataa ggaactatac     720
tacagtagaa ttaattgata gcagggatta agagatgtaa atgaatttga gatacatatt     780
ctagaggtag aatgtgcaat acttttttgta tgtccatata cagaaattgg ttgcattttc     840
cttaaataaa aagatttttt aaaagttagt gagctgttat gttttcttcc ctctgacttc     900
aattccttga ttctttcaat tttttttaata taaatttact gtctaaaagc tggatcagct     960
tatgctcctt tgttgagaga agttggcatg ctgtcaagtg ggctgggcac actg          1014
```